A. H. BERNTSEN & P. P. KILSTOFTE.
COTTER PIN.
APPLICATION FILED MAY 22, 1911.

1,107,881. Patented Aug. 18, 1914.

Witnesses:
Fred Palm
F. E. Dennett

Inventors:
Aksel H. Berntsen
Peder P. Kilstofte

By Hondens Bottum Fawsett & Bottum
Attorneys.

UNITED STATES PATENT OFFICE.

AKSEL H. BERNTSEN AND PEDER P. KILSTOFTE, OF WAUPUN, WISCONSIN.

COTTER-PIN.

1,107,881. Specification of Letters Patent. Patented Aug. 18, 1914.

Application filed May 22, 1911. Serial No. 628,866.

*To all whom it may concern:*

Be it known that we, AKSEL H. BERNTSEN and PEDER P. KILSTOFTE, citizens of the United States, residing at Waupun, in the county of Fond du Lac and State of Wisconsin, have invented certain new and useful Improvements in Cotter-Pins, of which the following is a specification, reference being had to the accompanying drawing, forming a part thereof.

This invention relates to cotter pins and the objects of the invention are to provide new and improved cotter pins which may be removed without the use of tools, which are not broken and destroyed in being removed, which may, therefore, be used for a long time, though removed and replaced frequently, and which will be equally as secure as the ordinary form of cotter pins now in use.

The ordinary cotter pins now in use require the ends to be spread apart to keep them in position. The ends must be bent together again to remove the pins. Some kind of a tool is necessary to spread the ends apart and to bend them together again and the bending of the ends destroys the pins in a very short time. A single removal of such a cotter pin is frequently the entire period of the life of the pin.

This invention provides a cotter pin, which may be of any preferred or desired shape in cross section, with a latch member which serves to lock the pin in place so that it cannot become displaced, the latch being of such construction that it can be readily manipulated by the fingers to lock or unlock the pin.

Figure 1:
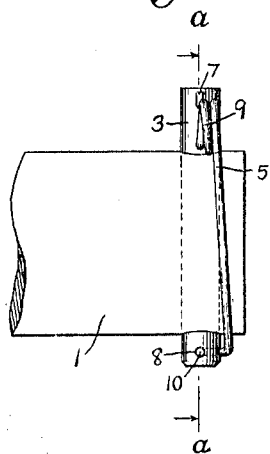
Figure 2:
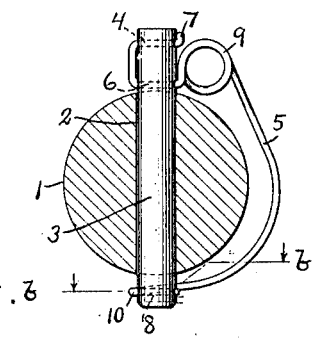

Referring to the drawings which accompany this specification and form a part thereof, which drawings illustrate an embodiment of this invention, and on which drawings the same reference characters are used to designate the same elements wherever they may appear in each of the several views, Figure 1 is an elevation of a cotter pin secured to a shaft; Fig. 2 is a cross sectional view of the shaft and pin, taken on the line *a—a* on Fig. 1, looking in the direction indicated by the arrows; and Fig. 3 is a cross sectional view of the pin, taken on the line *b—b* on Fig. 2, looking in the direction indicated by the arrows.

Referring specifically to the drawings, the reference numeral 1 designates a member, such as a shaft for example, with which it is desirable to use a cotter pin. This member 1 is provided with an aperture 2 for the reception of the pin. This aperture may be of any preferred or desired shape in cross section, and, preferably, the pin will conform to the shape of the aperture, though it need not necessarily. Figs. 1, 2 and 3 of the drawings illustrate a cylindrical pin and the member 1 is shown as provided with a cylindrical aperture.

Figure 3:
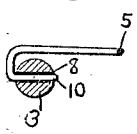

Referring to Figs. 1, 2 and 3 of the drawings, the reference numeral 3 designates a cylindrical pin to which is secured a latch member 5. Preferably the latch member 5 is made from spring wire and it is shaped so as to pass around the member in which the pin is placed, as clearly shown by the drawings. The latch member 5 may be secured to the pin 3 in any suitable manner. As illustrated by the drawings one end of the latch member 5 may be bent into a U-shape and passed through holes 4 and 6 in the pin with the extreme end 7 bent over against the pin as shown. The other end of the pin 3 is provided with an aperture or hole 8 in which the free end of the latch member 5 is received. The latch member 5 is bent into one or more coils 9 to increase its springiness or flexibility and, preferably, its free end 10 is bent back upon itself to form a hook, as clearly shown by Fig. 3 of the drawings, so that the springiness of the latch member will hold the free extremity in the hole 8 in a manner which will be readily understood. With this construction the latch member 5 must have sufficient range of movement toward the member 1 so that its free end can be engaged in the hole 8 and disengaged therefrom. The latch member 5 can be made flexible enough so that it can be readily sprung into engagement with the pin or out of engagement therewith by the use of the fingers only and it should be noted that the latch member should have a range of flexibility sufficient to enable it to straddle the member in which the pin is to be used.

It will be readily seen that cotter pins embodying this invention may be placed in position or removed without the use of tools and that such cotter pins may be removed and replaced an indefinite number of times.

What is claimed is:

A cotter pin composed of a pin provided with an aperture in one end thereof and a latch member secured to the other end thereof, the said latch member being provided with a spring coil 9 and having its free end
5 bent back upon itself to form a hook to pass into the aperture in the pin from the opposite side of the pin from the spring coil 9.

In witness whereof we hereto affix our signatures in presence of two witnesses.

ASKEL H. BERNTSEN.
PEDER P. KILSTOFTE.

Witnesses:
ANTON GRAVESEN,
BEN KASTEIN.

Copies of this patent may be obtained for five cents each, by addressing the "Commissioner of Patents, Washington, D. C."